(12) United States Patent
Bradham et al.

(10) Patent No.: US 12,546,734 B2
(45) Date of Patent: Feb. 10, 2026

(54) MOISTURE MONITORING SYSTEM

(71) Applicant: Banyan Water, Inc., Austin, TX (US)

(72) Inventors: David M. Bradham, Austin, TX (US); Gillan A. Taddune, Austin, TX (US); Thomas A. Roberts, Ft. Lauderdale, FL (US)

(73) Assignee: Banyan Water, Inc., Austin, TX (US)

( * ) Notice: Subject to any disclaimer, the term of this patent is extended or adjusted under 35 U.S.C. 154(b) by 142 days.

(21) Appl. No.: 18/585,356

(22) Filed: Feb. 23, 2024

(65) Prior Publication Data

US 2025/0271379 A1 Aug. 28, 2025

(51) Int. Cl.
*G01N 27/04* (2006.01)
*F28C 3/08* (2006.01)

(52) U.S. Cl.
CPC ............ *G01N 27/048* (2013.01); *F28C 3/08* (2013.01)

(58) Field of Classification Search
CPC ................................ G01N 27/048; F28C 3/08
See application file for complete search history.

(56) References Cited

U.S. PATENT DOCUMENTS

| | | |
|---|---|---|
| 2006/0282498 A1 | 12/2006 | Muro |
| 2008/0077260 A1 | 3/2008 | Porter et al. |
| 2012/0079880 A1 | 4/2012 | Freitag |
| 2020/0003436 A1 | 1/2020 | Fulton et al. |
| 2020/0178598 A1 | 6/2020 | Mitchell |
| 2021/0356221 A1 | 11/2021 | Blay et al. |
| 2021/0364198 A1 | 11/2021 | Bittner |
| 2022/0011834 A1 | 1/2022 | Heydari |
| 2022/0034525 A1 | 2/2022 | Hanks |
| 2022/0124558 A1 | 4/2022 | Ross et al. |

(Continued)

FOREIGN PATENT DOCUMENTS

| | | | |
|---|---|---|---|
| CN | 1566958 A | * | 1/2005 |
| CN | 1625110 A | * | 6/2005 |

(Continued)

OTHER PUBLICATIONS

International Search Report and Written Opinion in related Application No. PCT/US2025/016273 mailed Jun. 9, 2025, 10 pages.

(Continued)

*Primary Examiner* — Emmanuel E Duke
(74) *Attorney, Agent, or Firm* — Zagorin Cave LLP

(57) ABSTRACT

A moisture monitoring system includes a wireless moisture monitoring node, a wireless gateway device, and a remote server that monitors environmental conditions associated with a fluid delivery system. The wireless moisture monitoring nodes are configured in a wireless local area network and communicate indications based on sensed information to the wireless gateway device. The wireless gateway device uses a wireless wide area network to communicate the indicators to the remote server, which provides, to a user, analytics and alerts based on the sensed information. The user may schedule maintenance or reconfigure the fluid delivery system based on the analytics or alerts. The moisture monitoring system can evaluate conditions in hard-to-reach locations and can provide information that may be used to improve performance of the fluid delivery system or reduce fluid or energy consumption of the fluid delivery system.

20 Claims, 9 Drawing Sheets

(56) References Cited

U.S. PATENT DOCUMENTS

| | | |
|---|---|---|
| 2022/0197315 A1 | 6/2022 | Villacorte et al. |
| 2023/0087068 A1 | 3/2023 | Unge |
| 2023/0204265 A1 | 6/2023 | Lee et al. |
| 2023/0384011 A1 | 11/2023 | Jones |

FOREIGN PATENT DOCUMENTS

| | | | | |
|---|---|---|---|---|
| CN | 201242545 Y | * | 5/2009 | |
| CN | 201508618 U | * | 6/2010 | |
| CN | 201532700 U | * | 7/2010 | |
| CN | 103648185 A | * | 3/2014 | |
| CN | 204718990 U | * | 10/2015 | |
| CN | 206181099 U | * | 5/2017 | |
| CN | 114401457 A | * | 4/2022 | ............ H04W 24/04 |
| CN | 114778024 A | | 7/2022 | |
| DE | 10144022 A1 | * | 3/2003 | ............ A61F 13/42 |
| KR | 10-2019-0032166 A | | 3/2019 | |
| KR | 102030434 B1 | * | 10/2019 | ............ F24F 5/0035 |

OTHER PUBLICATIONS

AVTECH, "Ashrae Recommended Data Center Temperature & Humidity," 1988-2024, downloaded from https://avtech.com on Feb. 6, 2024, 6 pages.

AVTECH, "Product Catalog," Spring 2024, downloaded from avtech.com on Feb. 6, 2024, 16 pages.

Banyan Water, "Banyan Water's Cooling Tower Monitoring," Jul. 2016, downloaded from www.banyanwater.com, 3 pages.

Texas Instruments, "MSP430FR235x, MSP430FR215x Mixed-Signal Microcontrollers," Dec. 2019, downloaded from www.ti.com, 145 pages.

U.S. Department of Energy, "Cooling Towers: Understanding Key Components of Cooling Towers and How to Improve Water Efficiency," Feb. 2011, downloaded from www.eere.energy.gov/informationcenter.com, 9 pages.

* cited by examiner

MOISTURE MONITORING SYSTEM

BACKGROUND

Field of the Invention

The disclosure relates to monitoring systems, and more particularly to monitoring systems for use with fluid delivery systems.

Description of the Related Art

Fluid delivery systems (e.g., irrigation systems, cooling tower systems, humidification and evaporative cooling systems, or indoor plumbing systems) have various commercial and consumer applications in which a client (e.g., a consumer, commercial enterprise, or an agent thereof) seeks to manage usage of water or other resource to reduce waste, lower costs, or prevent damage. Conventional fluid delivery systems receive inputs from sensors proximate to a system controller integrated with the fluid delivery system and coupled to the system controller via a wired interface. However, environmental conditions distant from the system controller in a target application may be useful for monitoring the performance or managing operation of the fluid delivery system. Those environmental conditions may vary across numerous locations or may occur at remote locations that are impractical for wired power or wired communications interfaces in a target application.

For example, an evaporative cooling system used in a data center application cools and adds moisture to air, thereby reducing the risk of performance failures or damage to equipment. An exemplary evaporative cooling system forces hot air through a medium that absorbs and holds water. As the hot air contacts water in the medium, the water evaporates. Evaporation of the water uses energy from the air, which cools the air. However, direct evaporative cooling increases moisture in the air. An evaporative cooling system cannot reduce air temperature below a certain point based on the starting temperature and humidity of the source air. A humidity level that exceeds target humidity levels (e.g., a target humidity is between 45% and 55%) or exceeds a recommended range of system operation (e.g., between 20% and 80%) can degrade performance and reliability of the evaporative cooling system. For example, a humidity level below 20% can lead to electrostatic discharge that can damage electronic equipment and humidity levels above 80% can cause condensation that causes moisture to accumulate, drip, and pond undetected in locations throughout the data center and can lead to growth of mold, hardware corrosion, and equipment failure. Accordingly, fluid delivery systems and associated techniques for monitoring a surrounding environment and managing those fluid delivery systems are desired.

SUMMARY OF EMBODIMENTS OF THE INVENTION

In at least one embodiment, a method for monitoring moisture conditions includes receiving sensed information from a sensor interface of a wireless moisture monitoring node. The method includes transmitting, by the wireless moisture monitoring node, an indication of the sensed information in response to detecting a change between the sensed information and stored prior sensed information. The method may include configuring a mode of operation of a wireless moisture monitoring node based on a configuration signal received by the wireless moisture monitoring node. The wireless moisture monitoring node may have an automatic meter reading mode, a pulse flow mode, and a moisture sensor mode. The wireless moisture monitoring node may store the sensed information. The sensed information may be a water meter reading, a water flow rate, or information regarding presence or absence of moisture in each of a plurality of zones of a fluid delivery system. The method may include periodically transmitting a packet including power information associated with the wireless moisture monitoring node and adjusting a power mode of the wireless moisture monitoring node in response to successful transmission of a predetermined number of packets. The sensed information may be associated with a presence or an absence of moisture in a zone of an evaporative cooling panel in an evaporative cooling system. The method may include determining a wetting rate or an evaporation rate of the zone of the evaporative cooling panel based on the sensed information and adjusting water delivery of the evaporative cooling system based on the wetting rate or the evaporation rate. The method may include providing the indication of the sensed information to a management system of a fluid delivery system. The indication may be transmitted from a location proximate to a sensor associated with the indication. The method may include receiving the indication of the sensed information using local area network communications, transmitting the indication of the sensed information using wide area wireless communications, performing analysis of a fluid delivery system based on the indication and stored information, and providing an alert or control signal update based on the analysis.

In at least one embodiment, a moisture monitoring system includes a wireless monitoring node including a sensor interface configured to receive sensed information, a controller configured to cause transmission of an indication of the sensed information in response to detecting a difference between the sensed information and stored prior sensed information, and a wireless communications interface configured to use local area wireless communications to transmit the indication of the sensed information. The controller may be further configured to cause periodic transmission of power information associated with the wireless moisture monitoring node, and to adjust a power mode of the wireless moisture monitoring node in response to successful transmission of a predetermined number of packets. The moisture monitoring system may further include a wireless gateway device. The wireless gateway device may include a local area network transceiver configured to receive the indication of the sensed information, a memory configured to store the indication, and a wide area network transceiver configured to transmit the indication of the sensed information. The wireless moisture monitoring node may be proximate to a sensor and may be included in a network of the wireless gateway device and wireless moisture monitoring nodes and corresponding sensors. The corresponding sensors may be disposed throughout an area affected by operation of a fluid delivery system. The moisture monitoring system may further include a remote server configured to receive the indication of the sensed information and configured to perform moisture analysis of a fluid delivery system. The moisture analysis may be based on the indication and information stored in the remote server. The remote server may be further configured to provide a user alert, adjust a control signal of the fluid delivery system, or schedule maintenance of the fluid delivery system based on the moisture analysis. The moisture analysis may include a repeater node comprising a second wireless communications interface. The repeater node may be configured to provide the indication of the sensed information to a management system of a fluid delivery system. The sensed information may be associated with moisture in a zone of an evaporative cooling panel in an evaporative cooling system.

In at least one embodiment, a moisture monitoring system includes a plurality of moisture sensing probes and a wireless moisture monitoring node. The wireless moisture monitoring node includes a wireless communications interface, a controller, and a plurality of switches coupled between corresponding moisture sensing probes of the plurality of moisture sensing probes and corresponding terminals of general-purpose input/output terminals of the controller. The controller is configured to cause the wireless communications interface to transmit an indication of a moisture condition sensed by each probe of the plurality of moisture sensing probes based on information received from the plurality of moisture sensing probes using the plurality of switches and the general-purpose input/output terminals. The moisture monitoring system may include a memory configured to store the moisture condition sensed by each probe. The indication may be information regarding presence or absence of moisture in a zone associated with an evaporative cooling panel of an evaporative cooling system. The controller may be further configured to cause periodic transmission of power information associated with the wireless moisture monitoring node, and to adjust a power mode of the wireless moisture monitoring node in response to successful transmission of a predetermined number of packets. The moisture monitoring system may include a repeater node comprising a second wireless communications interface, the repeater node being configured to provide the indication to a management system of the evaporative cooling system.

BRIEF DESCRIPTION OF THE DRAWINGS

The disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

A moisture monitoring system includes a wireless moisture monitoring node, a wireless gateway device, and a remote server that monitors environmental conditions associated with a fluid delivery system. The wireless moisture monitoring nodes are configured in a wireless local area network and communicate, to the wireless gateway device, indications based on sensed information. The wireless gateway device uses a wireless wide area network to communicate the indications to the remote server, which provides, to a user, analytics and alerts based on the sensed information. The user may schedule maintenance or reconfigure the fluid delivery system based on the analytics or alerts. Numerous wireless moisture monitoring nodes and sensors associated therewith can be distributed throughout one or more region affected by the fluid delivery system. In some embodiments, each wireless moisture monitoring node includes a sensor interface having various sensor inputs and the wireless moisture monitoring node configures itself according to the type of input received using the sensor interface. In some embodiments, each wireless moisture monitoring node performs edge computations and stores associated results and only transmits indications of the sensed information when the sensed information changes. In some embodiments, each wireless moisture monitoring node configures its power mode based on a predetermined number of successful data transmissions. As a result, battery-powered wireless moisture monitoring nodes have extended battery life, and the moisture monitoring system can evaluate conditions in hard-to-reach locations and provides information that may be used to improve performance of the fluid delivery system or reduce fluid or energy consumption of the fluid delivery system.

Figure 1:
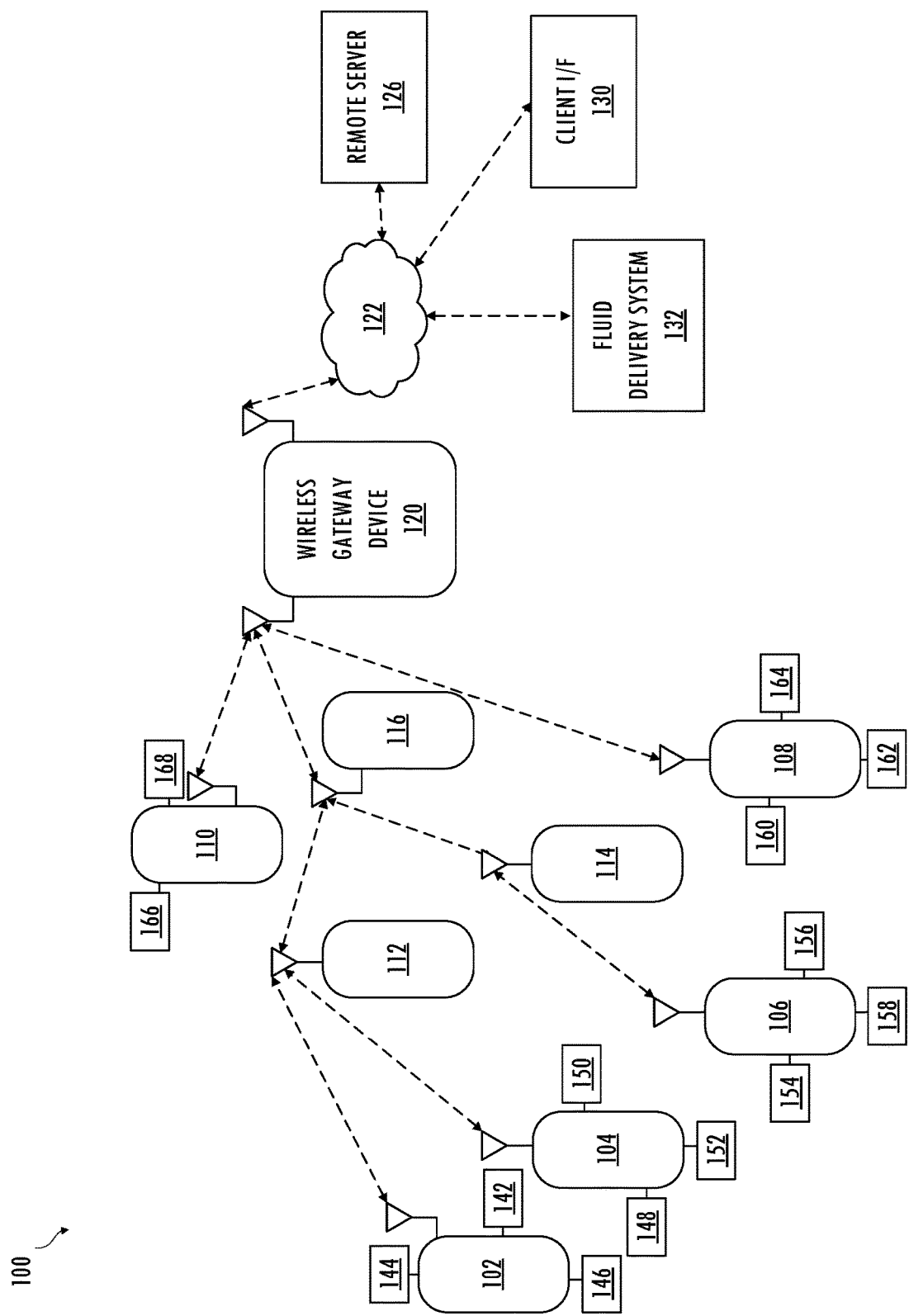
FIG. 1 illustrates a functional block diagram of an exemplary moisture monitoring system consistent with at least one embodiment of the invention.

Referring to FIG. 1, in at least one embodiment, moisture monitoring system 100 includes at least one wireless moisture monitoring node coupled to at least one corresponding sensor. Wireless moisture monitoring nodes 102, 104, 106, 108, and 110 are coupled to sensors 142, 144, and 146, sensors 148, 150, and 152, sensors 154, 156, and 158, sensors 160, 162, and 164, and sensors 166 and 168, respectively. Sensors 142, 144, 146, . . . , 168 each sense a moisture condition, e.g., presence or absence of moisture, humidity, temperature, water pressure, water consumption, wet bulb temperature, etc. The number and types of sensors used varies with the fluid delivery system being monitored and the application in which the fluid delivery system is used. Each wireless moisture monitoring node may interface to different numbers or types of sensors. For example, an irrigation system may include wireless moisture monitoring nodes and associated moisture detection sensors distributed throughout a parcel of land receiving water from the irrigation system and includes wireless moisture monitoring nodes and associated flow meters at other locations associated with the irrigation system. In at least one embodiment, moisture monitoring system 100 uses edge computing, i.e., at least some sensed information is processed locally by wireless moisture monitoring node 102 instead of being sent to a remote server 126 for all data analysis. In at least one embodiment, edge computing reduces the amount of data transmitted and the number of transmissions, thereby reducing power consumption of a wireless moisture monitoring node 102 as compared to a wireless moisture monitoring node that transmits all sensed information. The wireless monitoring nodes need not be coupled to the Internet for proper operation and at least one interface of a wireless monitoring node directly or indirectly provides indications of sensed information to a user or other portion of moisture monitoring system 100 via a wireless gateway device 120 as described further below.

In at least one embodiment of moisture monitoring system 100, at least one wireless moisture monitoring node is out of range of wireless gateway device 120 via a wireless local area network communications interface (i.e., a network communications interface compliant with a standard wireless local area network communications protocol, e.g., Bluetooth® Low Energy (BLE), Zigbee®, Matter, other IEEE 802.15.4 protocol, Wi-Fi or other IEEE 802.11 protocol, or other short range radio frequency communications systems or local area network protocol standard) and at least one additional wireless moisture monitoring node is configured as a repeater node that receives communications from another wireless moisture monitoring node and transmits the communications to another repeater or wireless gateway device 120. For example, wireless moisture monitoring nodes 112 and 114 are configured as repeaters that listen for communications from wireless moisture monitoring nodes 102 and 104 and wireless moisture monitoring node 106, respectively, and communicate transmissions received from those wireless moisture monitoring nodes to wireless moisture monitoring node 116, which is also configured as a repeater and communicates those transmissions to wireless gateway device 120. Wireless moisture monitoring nodes 108 and 110 are within communication range of wireless gateway device 120 and communicate directly with wireless gateway device 120 via a predetermined local area network communications protocol.

In at least one embodiment, wireless gateway device 120 stores information from transmissions received via local area network communications and retransmits the information using wide area network communications (e.g., a 3rd Generation Partnership Project (3GPP) standard protocol or other mobile telecommunications protocol). In at least one embodiment of moisture monitoring system 100, wireless monitoring nodes or wireless gateway devices are located in industrial plumbing rooms, control rooms, or closets to detect leaks in an industrial facility or are located outdoors to monitor irrigation systems. In at least one embodiment, additional wireless gateway devices are used. For example, the number of wireless gateway devices increases with an increase in the area over which the wireless monitoring nodes are distributed. Alternatively, rather than increase the number of wireless gateway devices used, wireless monitoring nodes configured as repeaters may communicate with other wireless monitoring nodes that are out of range of the wireless gateway device. In some embodiments of moisture monitoring system 100, a combination of multiple wireless gateway devices and repeaters are used to monitor an area affected by a fluid delivery system.

In at least one embodiment, wireless gateway device 120 communicates with remote server 126 via network 122, which includes a network of interconnected computers and communications devices (e.g., the Internet). In at least one embodiment, remote server 126 stores the information received from the wireless gateway devices. Remote server 126 uses that information and other stored information to analyze the information received from wireless moisture monitoring nodes and provides user alerts based on that analysis. In at least one embodiment, remote server 126 provides the information to a user via network 122 and client interface 130 or automatically updates a program of fluid delivery system 132 via network 122 based on the analysis. In at least one embodiment, moisture monitoring system operates independently from control of fluid delivery system 132 and a user receives the analysis provided by remote server 126 or client interface 130 and in response, schedules maintenance of fluid delivery system 132 or otherwise adjusts operation of fluid delivery system 132.

Figure 2:
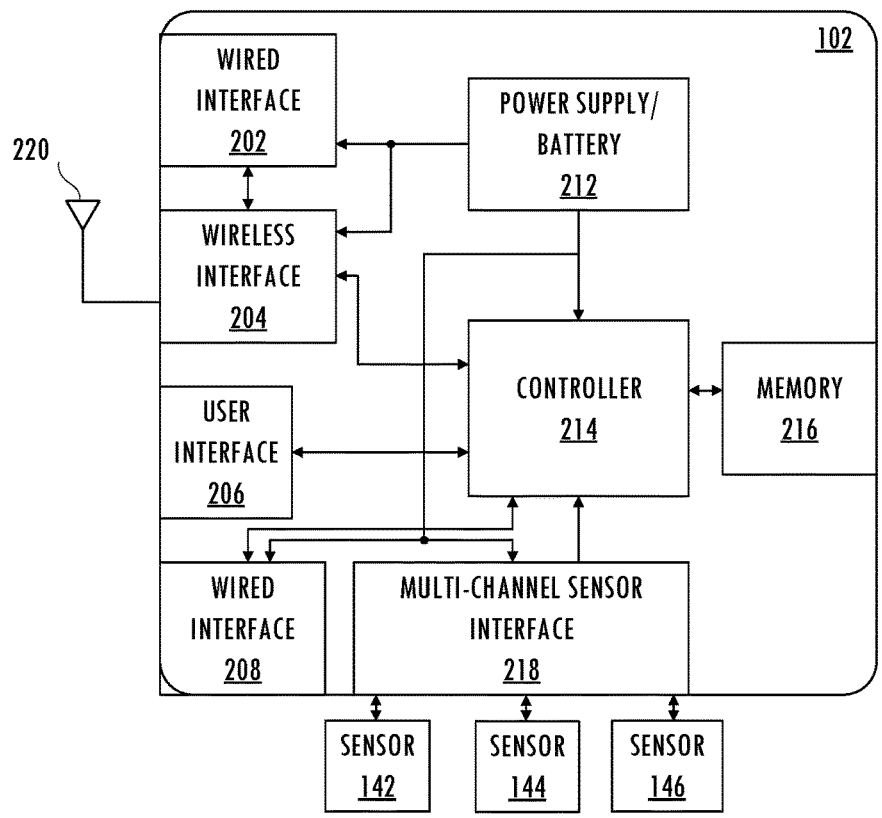
FIG. 2 illustrates a functional block diagram of an exemplary wireless moisture monitoring node consistent with at least one embodiment of the invention.

Referring to FIG. 2, in at least one embodiment of wireless moisture monitoring node 102, a printed circuit board supports processing components, e.g., a controller, microcontroller, microprocessor, or other general purpose processing device, that cooperate to process sensed information. In at least one embodiment controller 214 is a low-power mixed signal microcontroller MSP430FR2355, manufactured by Texas Instruments. However, in other embodiments, other processing or microcontroller devices are used. In at least one embodiment, controller 214 executes instructions to process information stored in memory 216, such as control instructions and data processing instructions. Controller 214 initializes wireless moisture monitoring node 102 and manages power consumption, interactions with sensors, user interfaces, and wired and wireless communications interfaces. Controller 214 is configured to receive sensed information from one or more sensors using multi-channel sensor interface 218. Multi-channel sensor interface 218 may be communicatively coupled to one or more sensors, e.g., a pressure sensor, flow rate sensor, utility water meter, precipitation sensor, humidity sensor, moisture sensor, temperature sensor, other sensor, or combinations thereof. In at least one embodiment, multi-channel sensor interface 218 includes an automatic meter reading (AMR) interface and a pulsed input interface, although other signaling protocols may be implemented by one or more channels of multi-channel sensor interface 218. In at least one embodiment, multi-channel sensor interface 218 includes clock and data connections for the AMR interface. The associated clock and data signals are routed to input clock and data input/output pins of controller 214 via conductive traces. In at least one embodiment, multi-channel sensor interface 218 includes at least one switch coupled between a wire connector (or other port on the printed circuit board) and a general-purpose input/output pin of controller 214 via conductive traces. In at least one embodiment, the switch is a p-type metal-oxide semiconductor field effect transistor (i.e., a p-type MOSFET) having a source terminal coupled to a 3 V power supply, a drain terminal coupled to ground, and a gate terminal coupled to the wire connector. The drain terminal of the switch is also coupled to a general-purpose input/output pin of controller 214. In an embodiment, four or eight or sixteen switches are coupled to corresponding wire connectors and corresponding general-purpose input/output pins of controller 214. In an embodiment, in the pulse flow mode of operation of wireless moisture monitoring node 102, general-purpose input/output ports of controller 214 are configured to generate an interrupt in response to the pulsed input signal and in the moisture/leak detection mode of wireless moisture monitoring node 102, interrupts are disabled for the general-purpose input/output ports of controller 214.

In at least one embodiment, controller 214 includes a processor that executes firmware (i.e., instructions) retrieved from memory 216. For example, controller 214 executes a main process that detects an established communication channel with wireless gateway device. If the main thread does not detect a communication channel with the wireless gateway device, the main thread establishes a communication channel with the wireless gateway device according to a predetermined wireless local area network protocol. In an embodiment, controller 214 executes at least one additional thread for a sensor channel. Each of these additional threads polls a sensor interface of multi-channel sensor interface 218 for incoming signals from a corresponding sensor. The main thread periodically polls each sensor thread in round-robin order. For those sensors that implement a request-response interface, in response to an empty payload, the main thread does nothing. In response to receiving a payload message from a sensor, the main thread receives the message, converts the payload to metadata for storage and sends the metadata or indication thereof to the wireless gateway device. In addition, the main thread may analyze information in the message or the sensor inputs to determine whether changed data is detected, the sensed information exceeds a threshold, or other analysis of the sensed information before determining whether to transmit associated information.

In at least one embodiment, wireless moisture monitoring node 102 includes wired interface 208 that provides an interface for digital parallel communications (e.g., a Universal Serial Bus (USB) interface). Wired interface 202 may be used to communicate with another device to locally update software, parameters, or other information stored in memory 216. Wired interface 208 implements a digital serial communications interface (e.g., a RS-485 UART interface) that may be used to digitally communicate with sensors that have a compatible interface (e.g., ultrasonic flow sensing or electricity meters). In an embodiment, wireless interface 204 (e.g., a Digi XBee® RF module) includes a radio that communicatively couples wireless moisture monitoring node 102 to a wireless gateway device via a wireless network (e.g., Bluetooth® Low Energy (BLE), Zigbee®, Matter, or other IEEE 802.15.4 protocol, Wi-Fi or other IEEE 802.11 protocol, or other short range radio frequency communications systems or local area network protocol standard) using antenna 220. In at least one embodiment, wireless moisture monitoring node 102 receives firmware updates from a central system via wireless interface 204. In an embodiment of wireless moisture monitoring node 102, user interface 206 locally displays information according to controller 214 and provides manual inputs received directly from a user to controller 214. User interface 206 may include a touchscreen display, liquid crystal display, keypad, dial, other input device, or a combination thereof. Power supply and converter 212 provides suitable power supply signals to each of the various components of wireless moisture monitoring node 102 and may be coupled to a battery, solar panel, or an energy harvesting storage device (not shown). In at least one embodiment, the printed circuit board also includes an interface configured to couple wireless moisture monitoring node 102 to an auxiliary module for direct communication between a customer network via Transmission Control Protocol/Internet Protocol (TCP/IP) over a wired or wireless interface, providing a secure proprietary data link. In other embodiments of wireless moisture monitoring node 102, other components are included.

Figure 3:
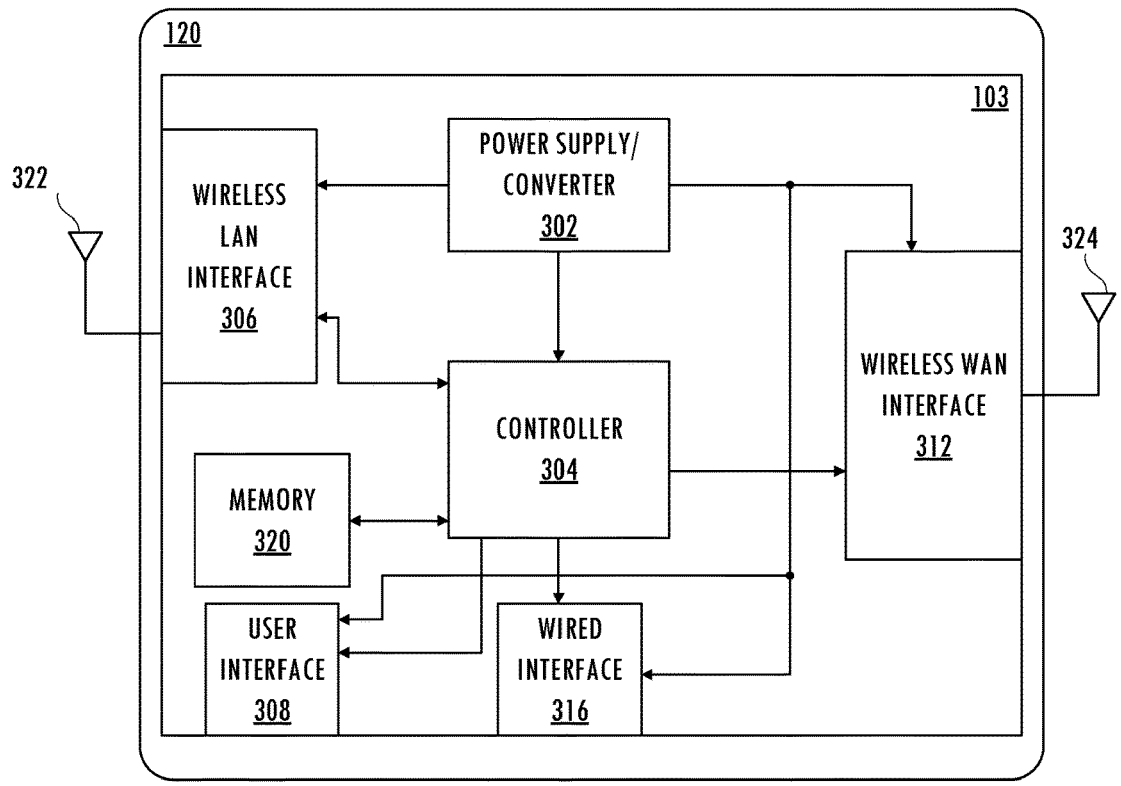
FIG. 3 illustrates a functional block diagram of an exemplary wireless gateway device consistent with at least one embodiment of the invention.

Referring to FIG. 3, in at least one embodiment of wireless gateway device 120, a printed circuit board supports processing components that cooperate to receive information from one or more wireless moisture monitoring nodes over a local area network or personal area network and to transmit that information using a local area network or a wide area network. For example, controller 304 executes instructions to process information stored in memory 320, such as control instructions, storage instructions, or data analysis instructions. Controller 304 initializes wireless gateway device 120 and manages power consumption and interactions with memory, a user interface, and wired and wireless communications interfaces.

In at least one embodiment, controller 304 includes a processor that executes firmware (i.e., instructions) retrieved from memory 320. Controller 304 executes a main process that detects communications from one or more wireless moisture monitoring nodes and communicates with a remote server. If the main thread does not detect a communication with a remote server, the main thread establishes a communication with the remote server using a predetermined wide area network protocol. Controller 304 receives incoming messages from wireless LAN interface 306. For those wireless moisture monitoring nodes that implement a request-response interface, in response to an empty payload, the main thread does nothing. In response to receiving a payload message from a wireless moisture monitoring node, the main thread receives the message, converts the payload to metadata for storage and sends the metadata to the remote server. In addition, the main thread may process the inputs from a wireless moisture monitoring node according to application requirements e.g., to compile information from multiple nodes and determine whether the compiled information has changed data, the compiled information exceeds a threshold, or other analysis of the compiled information.

In at least one embodiment, wireless gateway device 120 includes wired interface 316 that provides an interface for digital communications (e.g., a Universal Serial Bus (USB) interface or an RS-485 UART interface). Wired interface 316 may be used to communicate with another device to locally update software, parameters, or scheduling information stored in memory 320. In an embodiment, wireless LAN interface 306 includes a radio frequency transceiver that uses antenna 322 to communicatively couple wireless gateway device 120 to one or more wireless moisture monitoring node via a predetermined wireless network (e.g., using Bluetooth® Low Energy (BLE), Zigbee®, Matter, or other IEEE 802.15.4 standard compliant interface Wi-Fi or other IEEE 802.11 standard compliant interface, or other personal or local area network protocol standards). In at least one embodiment, wireless WAN interface 312 includes a radio frequency transceiver (e.g., a radio compliant with IEEE 802.11, cellular, or other wireless communications protocol) that uses antenna 324 to communicatively couple wireless gateway device 120 to a router that couples wireless gateway device 120 to a remote server via the Internet. In at least one embodiment, wireless gateway device 120 receives firmware updates from a central system via wireless LAN interface 306 or wireless WAN interface 312. User interface 308 locally displays information from controller 304 and provides manual inputs received directly from a user to controller 304. User interface 308 may include a touchscreen display, liquid crystal display, keypad, dial, other input device, or a combination thereof. Power supply and converter 302 provides suitable power supply signals to each of the various components of wireless gateway device 120 and may be coupled to a battery or an energy harvesting storage device (not shown). In other embodiments of wireless gateway device 120, other components are included. For example, an embodiment of wireless gateway device 120 includes a sensor interface that is compliant with an irrigation controller or sensor and that may be used to monitor wired flow pulse water meters or other sensors.

In at least one embodiment of moisture monitoring system 100, wireless moisture monitoring node 102 and wireless gateway device 120 communicate securely using the wireless LAN. For example, wireless moisture monitoring node 102 encrypts data using a predetermined encryption key that is used by wireless gateway device 120 to decrypt the data. In an embodiment, wireless gateway device 120 and wireless moisture monitoring nodes 102, 104, 106, . . . , and 116 implement wireless networking techniques (e.g., IEEE 802.15.4 standard mesh networking techniques) that support communications with many wireless devices in proximity to reduce or eliminate congestion, noise, or retransmissions.

Figure 4:
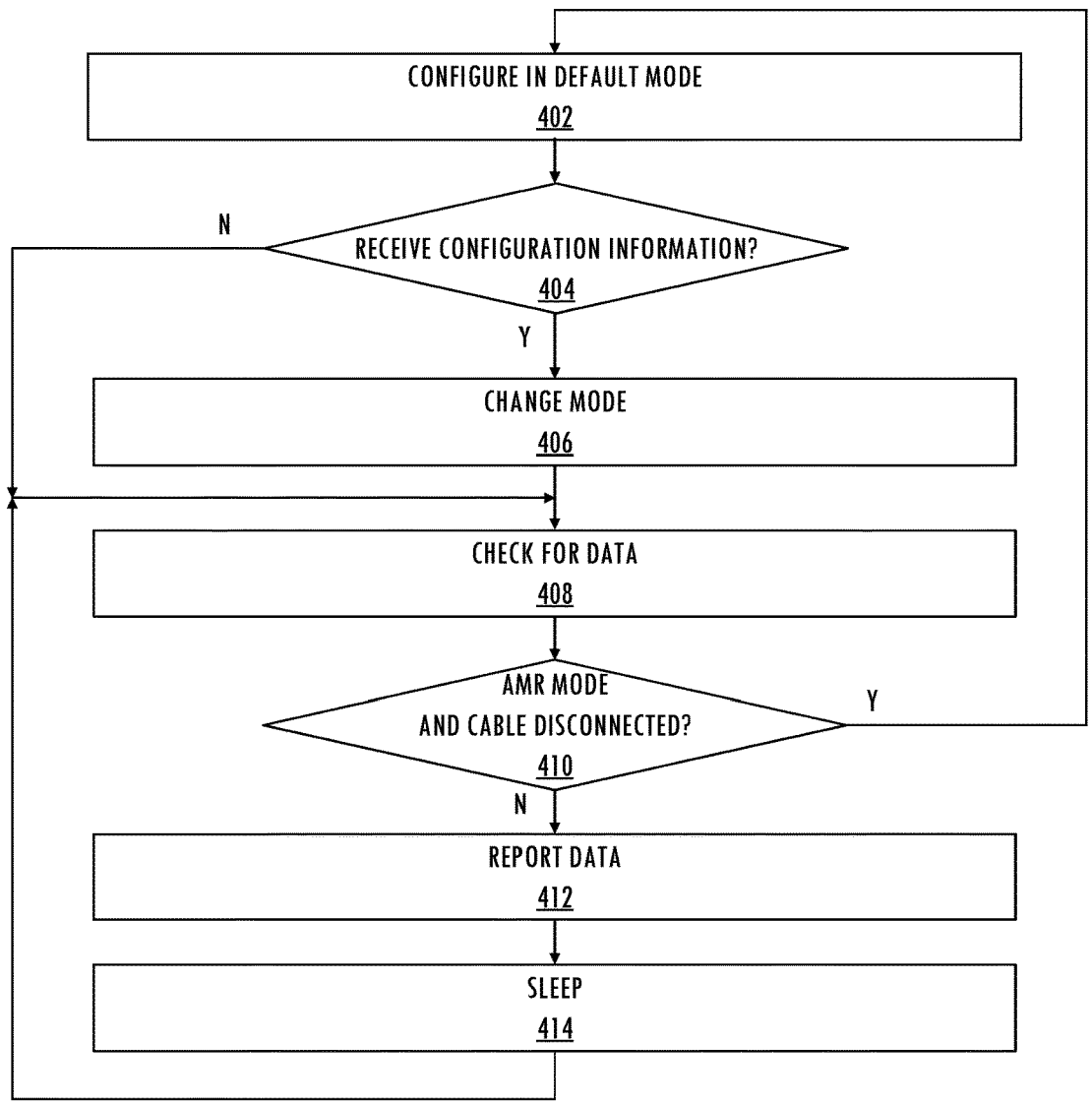
FIG. 4 illustrates a flowchart including information and control flows for operating a wireless moisture monitoring node consistent with at least one embodiment of the invention.

Referring to FIGS. 1, 2, and 4, in at least one embodiment of wireless moisture monitoring node 102, controller 214 executes firmware to configure wireless moisture monitoring node 102 in a default mode of operation (402). In an embodiment, the default mode of operation includes operating in full transmit power mode. In at least one embodiment of wireless moisture monitoring node 102, each mode of operation periodically (e.g., hourly) reports status information to wireless gateway device 120. In an embodiment, that status information includes battery voltage level and current radio power level although other status information may be reported. In at least one embodiment, wireless moisture monitoring node 102 communicates low battery data to alert a user of the need to change the batteries.

While in default mode, wireless moisture monitoring node 102 determines whether configuration information has been received, e.g., from wireless gateway device 120 (404). If configuration information has been received, wireless moisture monitoring node 102 changes the mode of operation based on that configuration information (406). In at least one embodiment, if wireless moisture monitoring node 102 has not received configuration information from wireless gateway device 120, then wireless moisture monitoring node 102 continues to operate in the default mode. In an embodiment, in the default mode wireless moisture monitoring node 102 checks for data (e.g., updated battery information or updated communication information) (408) and since the default mode is not the AMR mode (410), after expiration of a predetermined period, wireless moisture monitoring node 102 transmits the updated data to provide the user with details about battery level, wireless communication, and signal strength that a user may use to adjust the antenna to improve wireless communications performance (412). After a predetermined amount of time, controller 214 configures wireless moisture monitoring node 102 in a reduced power sleep mode (414). After expiration of a predetermined sleep period, controller 214 wakes wireless moisture monitoring node 102 from the reduced power sleep mode and checks for data again (408).

If wireless moisture monitoring node 102 received configuration information, then controller 214 changes the mode of operation of wireless moisture monitoring node 102 based on that configuration information (406). In an embodiment, wireless moisture monitoring node 102 checks for data. If in AMR mode, then controller 214 communicates with a water meter coupled to multi-channel sensor interface 218 using the AMR protocol and corresponding 3-wire AMR cable (408). If wireless moisture monitoring node 102 is configured in AMR mode and receives no signal via multi-channel sensor interface 218, then controller 214 determines that the cable is disconnected and configures wireless moisture monitoring node 102 in default mode (402). If wireless moisture monitoring node 102 is configured in AMR mode and receives an AMR signal via multi-channel sensor interface 218 (410), then the cable is not disconnected (410) and wireless moisture monitoring node 102 reports a water meter reading along with battery level, wireless communication, and signal strength (412). After a predetermined amount of time, controller 214 configures wireless moisture monitoring node 102 in a reduced power sleep mode (414). After expiration of a predetermined sleep period, controller 214 wakes wireless moisture monitoring node 102 from the reduced power sleep mode and checks for data again (408).

If wireless moisture monitoring node 102 is configured in pulse flow mode, controller 214 detects an interrupt in response to a pulsed input signal received using multi-channel sensor interface (e.g., on general purpose input/output ports of controller 214 configured to generate an interrupt), wireless moisture monitoring node 102 is not in AMR mode (410) and wireless moisture monitoring node 102 reports measured flow rate according to the data received using multi-channel sensor interface along with battery level, wireless communication, and signal strength (412). After a predetermined amount of time, controller 214 configures wireless moisture monitoring node 102 in a reduced power sleep mode (414). After expiration of a predetermined sleep period, controller 214 wakes wireless moisture monitoring node 102 from the reduced power sleep mode and checks for data again (408).

If wireless moisture monitoring node 102 is configured in moisture/leak detection mode, then controller 214 polls multi-channel sensor interface for the state of the moisture probe, e.g., polls each general-purpose input/output port of controller 214 coupled to a corresponding moisture probe via a wire connected to a corresponding switch. Since wireless moisture monitoring node 102 is not in AMR mode (410), wireless moisture monitoring node 102 reports a status (i.e., dry or wet) of the moisture probes, e.g., using a digital code including a bit indicating the status of each moisture probe, along with battery level, wireless communication, and signal strength (412). In other embodiments, wireless moisture monitoring node 102 only reports the status of a moisture probe (i.e., dry or wet) along with battery level, wireless communication, and signal strength if one or more of the moisture probes have a status that is different from a corresponding stored previous status (412). After a predetermined amount of time, controller 214 configures wireless moisture monitoring node 102 in a reduced power sleep mode (414). After expiration of a predetermined sleep period, controller 214 wakes wireless moisture monitoring node 102 from the reduced power sleep mode and checks for data again (408).

In at least one embodiment, if controller 214 detects a signal from an active sensor received via multi-channel sensor interface 218 (404), the controller 214 changes the mode from the default mode to another mode determined according to the received signal (406). In at least one operating mode, if wireless moisture monitoring node 102 does not receive a response from a repeater node or wireless gateway device after a predetermined number of transmissions from wireless moisture monitoring node 102, wireless moisture monitoring node 102 configures itself in a full power mode of operation and searches for a new repeater node or wireless gateway device. In at least one operating mode, if sensor information is out of a predetermined target range, wireless moisture monitoring node 102 sends a message to the wireless gateway device to notify a user or automated control system to adjust the fluid delivery system or to schedule maintenance or repairs of moisture monitoring system 100 or fluid delivery system 132. In some modes, wireless moisture monitoring node 102 sends water consumption information, e.g., a flow rate measured in gallons, or other moisture-related information provided by a sensor coupled to the wireless moisture monitoring node 102.

In at least one embodiment, wireless moisture monitoring node 102 operates in one of a plurality of modes, e.g., an automatic meter reading (AMR) mode, a pulse flow mode, and a moisture detection/leak detection mode. If multi-channel sensor interface 218 receives an AMR using an electrical interface compliant with conventional AMR communication technology, then controller 214 configures wireless moisture monitoring node 102 in an AMR mode of operation. In AMR mode, wireless moisture monitoring node 102 is configured to periodically read a meter coupled to multi-channel sensor interface 218 according to a predetermined period stored in memory 216 (e.g., as part of configuration information received from wireless gateway device via wireless interface 204, user interface 206, or wired interface 208). In an embodiment of AMR mode, that information is also periodically transmitted to wireless gateway device 120. In another embodiment of the AMR mode, wireless moisture monitoring node 102 analyzes the meter reading (i.e., performs edge computations) and transmits only an indication of the sensed information (e.g., changed meter readings or analysis results that are detected based on the periodic meter reading). By only transmitting changed information in response to a changed meter readings or changed edge computation, wireless moisture monitoring node 102 can save substantial amounts of power, extend battery life, and reduce maintenance costs in some applications.

In at least one embodiment, if multi-channel sensor interface 218 receives a pulsed signal (e.g., from a conventional reed switch), then controller 214 configures wireless moisture monitoring node 102 in a pulse flow mode of operation. In the pulse flow mode, wireless moisture monitoring node 102 is configured to periodically read flow data from a flow meter coupled to multi-channel sensor interface 218 as long as water is flowing (e.g., sensed flow rate is non-zero). In an embodiment, the pulse flow channel receives a pulsed signal (e.g., a contact closure pulse input interface) and converts it into a digital signal (e.g., using a counter to count a total number of pulses received over a predetermined time). Controller 214 or other circuit converts that digital signal into a corresponding flow rate, e.g., using a predetermined look-up table or a digital-to-flow rate value conversion algorithm. A predetermined pulse flow sensor read period (e.g., one minute) is stored in memory 216 (e.g., as part of configuration information received from wireless gateway device via wireless interface 204, user interface 206, or wired interface 208). In an embodiment of the pulse flow mode, the sensed information is also transmitted to wireless gateway device 120 with that same periodicity or other periodicity. In another embodiment of the pulse flow mode, wireless moisture monitoring node 102 analyzes the sensed information (i.e., performs edge computations on the flow data) and transmits an indication of the sensed information (e.g., changed flow data or changed analysis results) that are detected based on the periodic reading. By only transmitting when changes occur to meter readings or analysis results, wireless moisture monitoring node 102 can save substantial amounts of power, extend battery life, and reduce maintenance costs in some applications. In at least one embodiment of the pulse flow mode, wireless moisture monitoring node 102 accumulates the sensed information or analysis results and stores the accumulated sensed information or analysis results in memory so that if data corruption occurs elsewhere in the monitoring system, the data can be recovered from wireless moisture monitoring node 102.

In at least one embodiment, if multi-channel sensor interface 218 receives an indication of moisture detected in a zone of a moisture detection channel, then controller 214 configures wireless moisture monitoring node 102 in a moisture/leak detection mode of operation. In the moisture/leak detection mode, each zone of the moisture detection channel will trigger wireless moisture monitoring node 102 to send moisture data (e.g., zone is moist or zone is dry) for each zone of the at least one zone to the wireless gateway device in response to a moisture sensor detecting moisture in that zone. If moisture is no longer being detected after being detected in a zone, that change in moisture detection status will also be sent to the wireless gateway device. In another embodiment of the moisture/leak detection mode, wireless moisture monitoring node 102 analyzes the sensed information (i.e., performs edge computations on sensed moisture data) and transmits only changed moisture statuses or changed analysis results. By only transmitting changed moisture statuses or changed analysis results, wireless moisture monitoring node 102 can save substantial amounts of power, extend battery life, and reduce maintenance costs in some applications. In at least one embodiment of the moisture/leak detection mode, wireless moisture monitoring node 102 accumulates and stores in memory the sensed moisture detection information so that if data corruption occurs elsewhere in the monitoring system, the data can be recovered from wireless moisture monitoring node 102.

Figure 5:
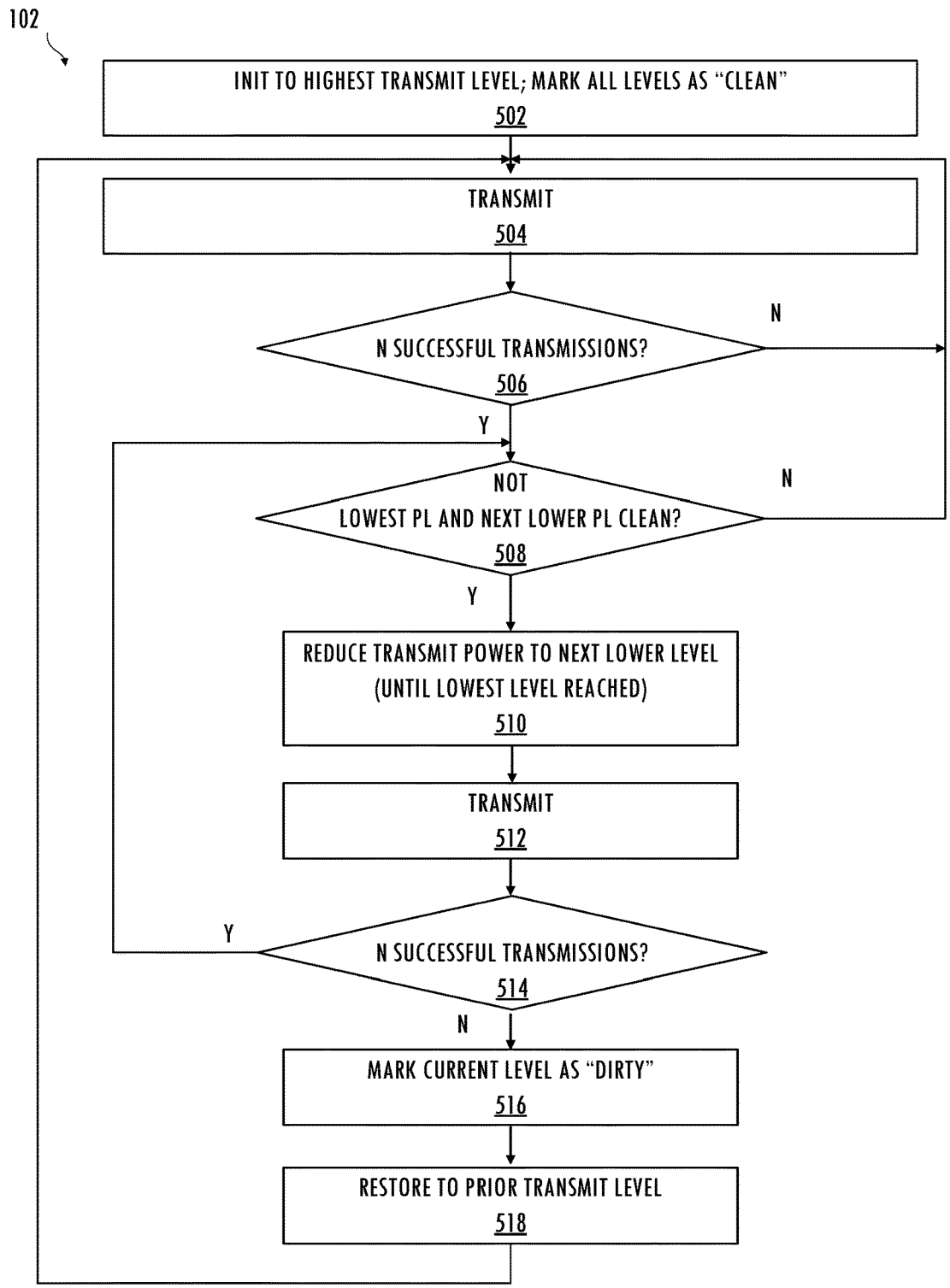
FIG. 5 illustrates a flowchart including information and control flows for configuring a power mode of the wireless moisture monitoring node consistent with at least one embodiment of the invention.

Referring to FIGS. 2 and 5, in at least one embodiment, wireless moisture monitoring node 102 manages power consumption by using multiple power modes. An exemplary wireless interface 204 has multiple power levels (e.g., 4, 3, 2, 1, and 0 corresponding to absolute power levels of +5 dBm, +3 dBm, +1 dBm, −1 dBm, and −5 dBm, respectively). Other wireless interfaces have different numbers of transmit power levels and different corresponding power levels. In a high-power mode of operation, wireless interface 204 is configured for a highest transmit power level. In an embodiment, after a reset or in a default mode, controller 214 initializes wireless moisture monitoring node 102 to transmit at a highest transmit power level (e.g., PL=4) and all transmit power levels are marked as "clean." (502). Wireless moisture monitoring node 102 transmits packets to a wireless gateway device or another wireless moisture monitoring node configured as a repeater according to the current mode of operation (504).

If any of a predetermined number (N) of sequential packet transmissions from wireless moisture monitoring node 102 has errors as indicated by information received in a corresponding acknowledgement packet or by not receiving a corresponding acknowledgement packet (506), then the corresponding packets were not successfully transmitted and controller 214 maintains a current transmit power level and does not reduce the transmit power level from the highest transmit power level. If wireless moisture monitoring node 102 completes a predetermined number (N) of successful sequential packet transmissions (i.e., wireless moisture monitoring node 102 transmits N packet transmissions and receives N corresponding acknowledgements indicating error-free transmission) (506), then controller 214 determines whether the current transmit power level is the lowest transmit power level and whether a next lower transmit power level is marked as "clean" (508). If the current transmit power level is the lowest transmit power level or the next lower transmit power level is "dirty" (i.e., not "clean"), then controller 214 does not reduce the transmit power level and wireless moisture monitoring node 102 continues transmitting at the current transmit power level. If the current transmit power level is not the lowest transmit power level and next lower transmit power level is "clean," then controller 214 reduces the transmit power level to the next lower transmit power level (510), and wireless moisture monitoring node 102 transmits at that next lowest transmit power level (512).

If wireless moisture monitoring node 102 completes a predetermined number (N) of successful sequential packet transmissions (i.e., wireless moisture monitoring node 102 transmits N sequential packet transmissions and receives N corresponding acknowledgements indicating error-free transmission) (514), then controller 214 determines whether the current transmit power level is the lowest transmit power level and whether a next lower transmit power level is marked as "clean" (508). If any of the next predetermined number (N) of sequential packet transmissions from wireless moisture monitoring node 102 are unsuccessful as indicated by information in a corresponding acknowledgement packet or a corresponding acknowledgement packet is not received (514), then controller 214 marks the current transmit power level as "dirty" (516) and restores wireless moisture monitoring node 102 to the prior transmit power level (518) and transmits at that prior transmit power level (504). If a lower transmit power mode was tried but resulted in errors, that transmit power level is not tried again. Thus, wireless moisture monitoring node 102 configures itself in the lowest, error-free transmit power mode, thereby substantially reducing power consumption as compared to a wireless moisture monitoring node 102 that has a transmit power fixed at a highest transmit power level.

In addition to managing the transmit power level as described above, embodiments of wireless moisture monitoring node 102 are configured to reduce the amount and size of transmissions to a wireless gateway device or other repeater device. For example, referring to FIGS. 1 and 6, in at least one embodiment of moisture monitoring system 100, wireless moisture monitoring node 102 monitors sensor levels (e.g., temperature, humidity, water pressure, moisture presence or absence, water consumption, or other conditions) according to an enabled mode of operation (602). If the level of sensed information does not change (604), then wireless moisture monitoring node 102 does not transmit any indication of the sensed information. If the level of sensed information does change (604), but the change is not significant, i.e., the changed amount is not above a predetermined threshold level (606), then wireless moisture monitoring node 102 does not transmit any sensed information. However, although wireless moisture monitoring node 102 does not transmit information based on sensed moisture or environmental information, wireless moisture monitoring node 102 may continue to store sensed information and periodically transmit other information (e.g., power or communication information) consistent with the current mode of operation.

Figure 6:
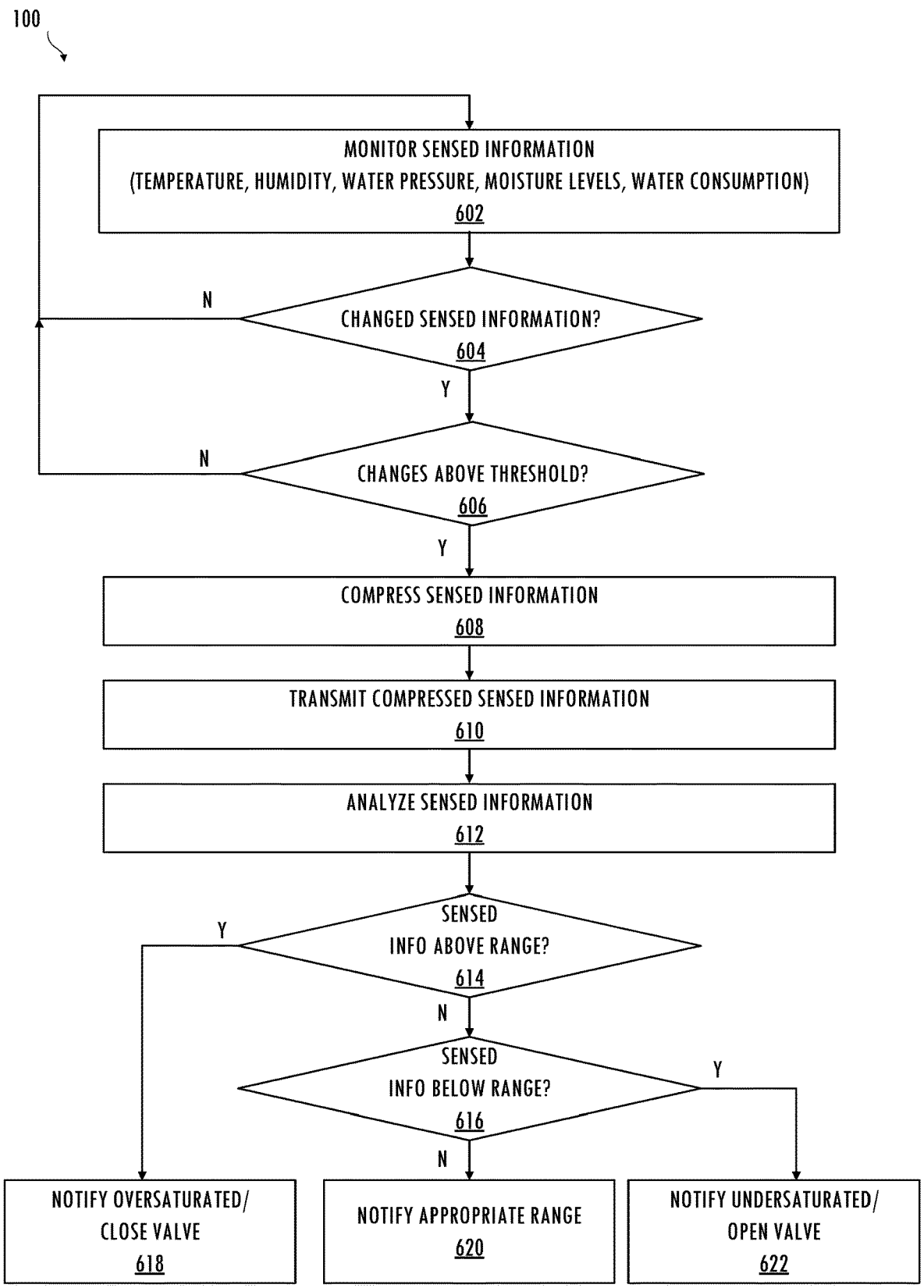
FIG. 6 illustrates a flowchart including information and control flows for a moisture monitoring system consistent with at least one embodiment of the invention.

If the level of sensed information does change (604), and the change is significant, e.g., the changed amount exceeds a predetermined threshold level (606), then wireless moisture monitoring node 102 compresses the sensed information (608) and transmits the compressed sensed information or other indication of sensed information (610). In at least one embodiment, wireless moisture monitoring node 102 performs other processing on the sensed information and only transmits processed information where appropriate. In at least one embodiment, wireless gateway device 120 stores the sensed information and transmits it to remote server 126, which analyzes the sensed information (612). That analysis may include comparisons to predetermined values or ranges. For example, if a humidity, flow rate, or moisture level is above a predetermined value or range of values (614), then that comparison indicates oversaturation of soil with water in an irrigation system or ineffective cooling by an evaporative cooling system. Therefore, the remote server notifies a user or fluid delivery system of the condition, and the user or remote server causes the fluid delivery system to cease or reduce water delivery, e.g., by closing one or more valves in the fluid delivery system (618). If the humidity, flow rate, or moisture level is below a predetermined value or range of values (616), that comparison indicates undersaturation of soil with water (i.e., dry soil) in an irrigation system or dangerously dry conditions in a cooling system. Therefore, the remote server notifies a user or fluid delivery system of the condition and the user, or the remote server, causes the fluid delivery system to start or increase water delivery, e.g., by opening one or more valves in the fluid delivery system (622). However, if the humidity, flow rate, or moisture level has a predetermined value or is within an appropriate range (616), then the remote server notifies a user that the system is operating within target specifications or maintains operation of the fluid delivery system in a current configuration (620). The information and control flows of FIGS. 4, 5, and 6 are exemplary only and other embodiments of a moisture monitoring system use other control sequences of operations with consistent data dependencies.

Figure 7:
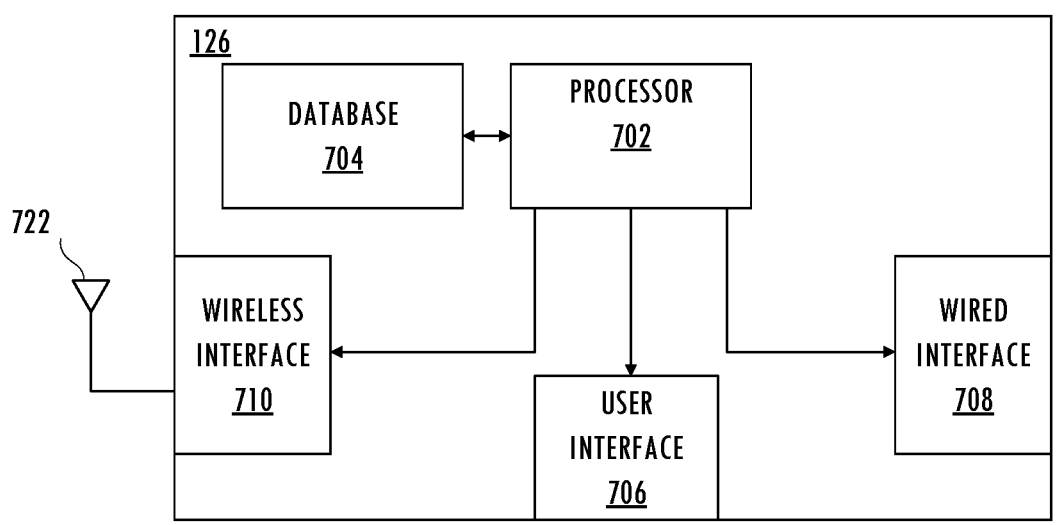
FIG. 7 illustrates a functional block diagram of an exemplary remote server consistent with at least one embodiment of the invention.

Referring to FIGS. 1 and 7, in at least one embodiment, remote server 126 is cloud-based and is coupled to client interface 130 or fluid delivery system 132 or wireless gateway device 120 via network 122, which includes a network of interconnected computers and communications devices (e.g., the Internet). Remote server 126 includes interfaces for receiving information from wireless gateway device 120 using wired interface 708 or wireless interface 710 and stores that information in database 704. In at least one embodiment, wired interface 708 (e.g., an Ethernet interface compliant with IEEE 802.3 or other wired network interface) or a wireless interface 710 (e.g., a radio compliant with Bluetooth® Low Energy (BLE), Zigbee®, Matter, other IEEE 802.15.4 standard compliant protocol, Wi-Fi, or other IEEE 802.11 standard compliant protocol, cellular, or other wireless communications protocol) that uses antenna 722 to communicatively couple remote server 126 to a router that couples remote server 126 to network 122. In at least one embodiment, remote server 126 includes user interface 706 including a display and input devices for the user to analyze performance of multiple properties. Database 704 stores flow data, temperature data, evaporation rates, saturation rates, leak data, alarm data, property configuration data, schedules, rate information, or other information. Remote server 126 includes at least one processor or other device (e.g., processor 702) configured to execute a computer program to analyze data stored in database 704, implements alert services, email services, or scheduling services, and provides reports, dashboards, alert oversight, and notifications (e.g., email, texts, etc.) to client interface 130. In other embodiments of remote server 126, other components are included.

Figure 8:
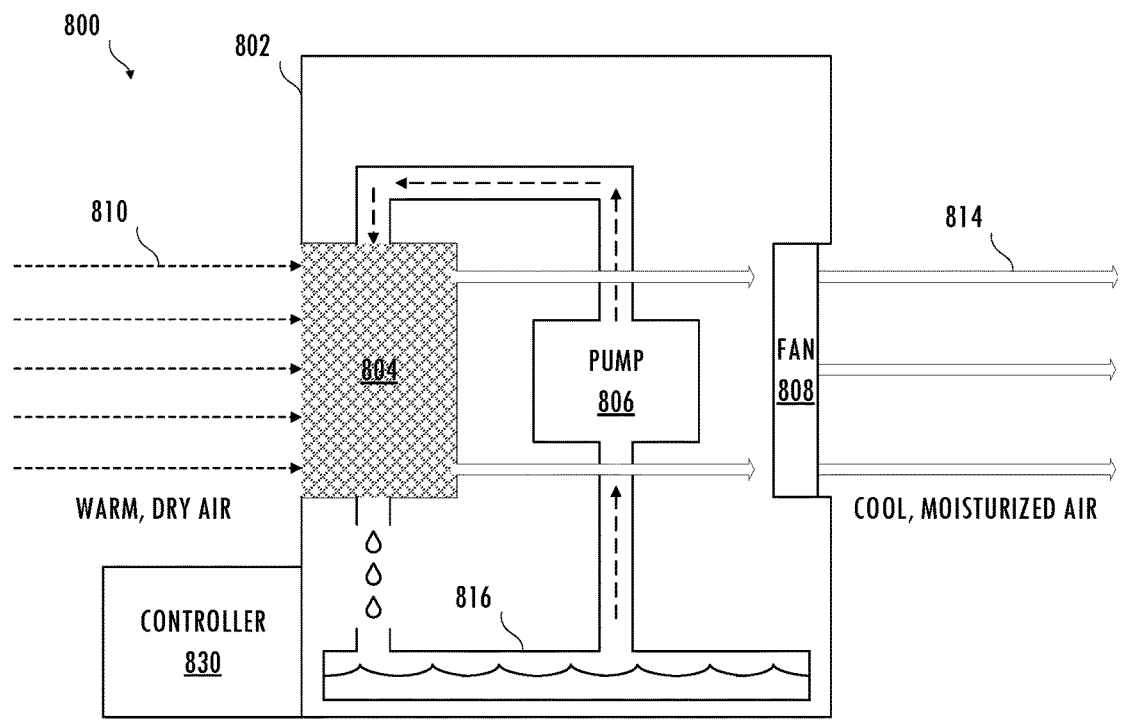
FIG. 8 illustrates a functional block diagram of an exemplary evaporative cooling system consistent with at least one embodiment of the invention.
Figure 9:
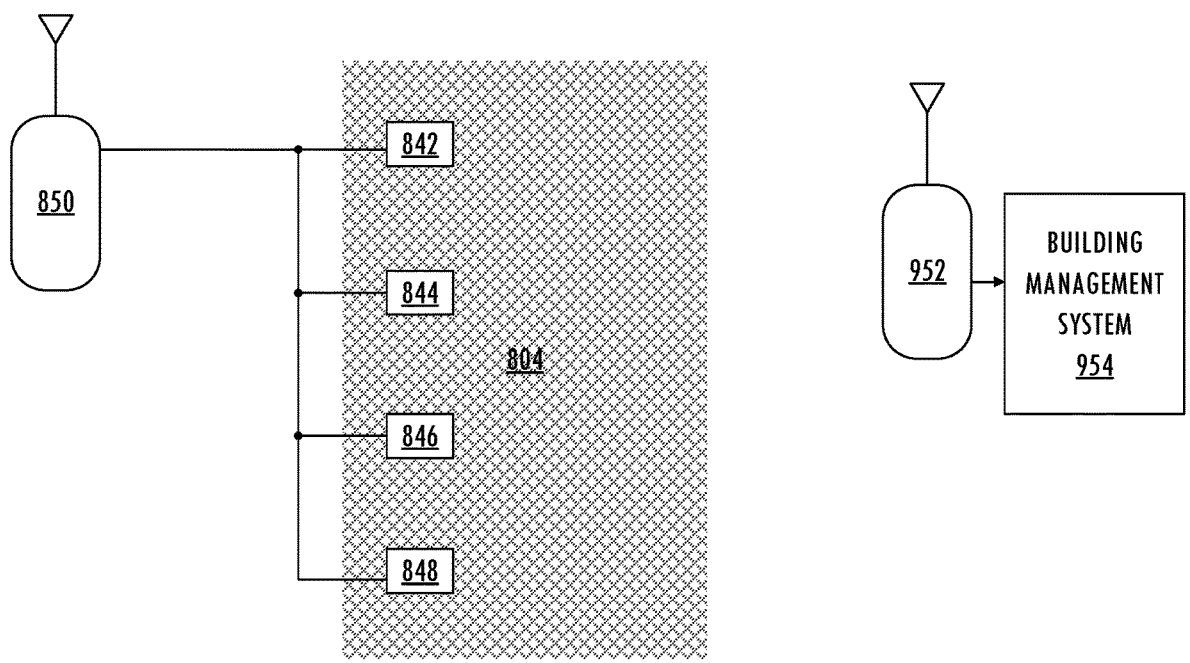
FIG. 9 illustrates a functional block diagram of a portion of the moisture monitoring system monitoring a cooling panel of an exemplary evaporative cooling system consistent with at least one embodiment of the invention.

Referring to FIGS. 1, 8, and 9, in at least one embodiment, moisture monitoring system 100 is used to monitor performance of evaporative cooling system 800. In an embodiment of evaporative cooling system 800, controller 830 causes pump 806 to pump water from reservoir 816 to moisten evaporative cooling panels 804. In at least one embodiment evaporative cooling panels 804 include corrugated, wavy cellulose sheets that are glued together or are molded with a honeycomb construction. In other embodiments, sheets of other natural (e.g., wood) or synthetic fibers are used. Fan 808 draws warm, dry air 810 across the wet evaporative cooling panels to expel cool moisturized air 814. Evaporative cooling unit 802 causes cooling via the evaporation of water according to well-defined relationships between cooling and water usage, evaporative cooling panel area, outside temperature/humidity, and water temperature. For every one degree of cooling produced by evaporative cooling unit 802, the relative humidity increases by a fixed amount (e.g., approximately 2.5° F.). Once moistened, a typical evaporative cooling panel tends to produce the same level of cooling for a predetermined amount of time (e.g., approximately ten minutes) and it takes a panel a well-defined amount of time (e.g., between 30 and 45 minutes) to fully dry after pump 806 shuts off. Since only pure water evaporates, minerals can build up on the panels and create a need for maintenance, e.g., to flush to remove mineral or contaminant buildup from the panels.

In at least one embodiment, wireless moisture monitoring node 850 is coupled to multiple (e.g., four or eight) moisture probes, which are attached to evaporative cooling panel 804 of evaporative cooling system 800. In at least one embodiment, the moisture probes detect moisture levels of a medium (e.g., evaporative cooling panel) based on capacitance, resistance, thermal conductivity, or other physical property of a material. For example, a moisture probe uses an electrical current to measure changes in resistance of a material or a high frequency signal to measure the capacitance of the material. As water absorbed by an evaporative cooling panel increases, the resistance of the evaporative cooling panel decreases, the capacitance increases, and the moisture probe provides an analog or digital signal to multi-channel sensor interface 218 corresponding to the moisture level in the zone based on the sensed capacitance or resistance. In at least one embodiment, the moisture probe indicates presence or absence of moisture in the zone of the evaporative cooling panel.

In an embodiment, each moisture probe coupled to wireless moisture monitoring node 850 is attached to evaporative cooling panel 804 in a way that does not interfere with the normal operation of the evaporative cooling system 800. A thin, multi-conductor cable including a shielded wire for each zone may be used. Each moisture probe includes a first terminal and a ground terminal. Each first terminal is coupled to an end of a corresponding shielded wire of the multi-conductor cable. The ground terminal is coupled to another shielded wire of the multi-conductor cable. In other embodiments, a separate shielded wire is coupled between each moisture probe and the multi-channel sensor interface 218. The ground wire may be shared by all zones or a separate ground terminal and wire included for each zone. In at least one embodiment, moisture probes 842, 844, 846, and 848 are coupled by a corresponding shielded wire to a corresponding switch of multi-channel sensor interface 218 (described above). In an embodiment, absence of water in a zone effectively opens the switch of the multi-channel sensor interface 218 (e.g., the first terminal of the probe is not coupled to the ground terminal) and presence of water in the zone effectively closes the switch of multi-channel sensor interface 218 (e.g., couples the first terminal to the ground terminal and discharges the gate of a corresponding p-type MOSFET to ground) thereby toggling a signal on a corresponding general-purpose input/output terminal of controller 214. In at least one embodiment, moisture probes 842, 844, 846, and 848 use thin, protected wires and non-corrosive clips to attach a corresponding moisture probe to the evaporative cooling panel without interfering with the air flow of the evaporative cooling panels. Moisture probes 842, 844, 846, and 848 detect when corresponding zones of evaporative cooling panel 804 are wet or dry and generate an indication thereof. In at least one embodiment, wireless moisture monitoring node 850 senses that information and transmits the sensed information to wireless monitoring node 952, which is configured as a repeater and includes a conventional interface to building management system 954 or a customer interface. In at least one embodiment, building management system 954 applies a predetermined response or alerts a client based on information received from wireless moisture monitoring node 850.

In at least one embodiment, wireless moisture monitoring node 850 analyses data received from the moisture probes 842, 844, 846, and 848. In at least one embodiment, building management system 954 disables water delivery to cooling panel 804 if moisture sensors indicate the zones are wet to control humidity or to reduce waste associated with a fluid delivery system. In at least one embodiment, the moisture probe information is used to determine a wetting rate or an evaporation rate of a zone of evaporative cooling panel 804. The wetting rate or evaporation rate can be used to calibrate the water usage via control of pump 806 or other control of evaporative cooling system 800. That information may also be used to identify a malfunction or other need for maintenance of evaporative cooling system 800 and wireless moisture monitoring node 850, wireless gateway device, remote server 126 or a user triggers alerts in response to the wetting rate or evaporation rate exceeding a predetermined threshold or being outside of predetermined ranges. In at least one embodiment of moisture monitoring system 100, at least one wireless moisture monitoring node and corresponding moisture sensors are disposed in other locations in the area being cooled by evaporative cooling system 800 to detect condensation that may drip or pond and contribute to growth of mold or damage to equipment being cooled by the evaporative cooling system. That moisture information can be used to alert a user of a malfunction or a need to update a program executed by controller 830, or other maintenance. In at least one embodiment, humidity probes are used instead of moisture probes and are coupled to a wireless moisture monitoring node 850 in a region serviced by evaporative cooling system 800. Wireless moisture monitoring node 850 analyses data received from the humidity sensors and triggers an alert in response to a sensed humidity below 30% or 40% or a sensed humidity above 60% or 70%.

In at least one embodiment of moisture monitoring system 100, wireless moisture monitoring node 850 is coupled to humidity sensors disposed in an area cooled by evaporative cooling system 800 to detect whether the humidity exceeds target humidity levels (e.g., between 45% and 55%) for target performance and reliability or whether the humidity levels exceed a recommended range for system operation (e.g., between 20% and 80%). Humidity levels below 20% can lead to electrostatic discharge that can damage electronic equipment and humidity levels above 80% can cause condensation that causes moisture to accumulate, drip, and pond undetected in locations throughout the data center and can lead to growth of mold, hardware corrosion, and equipment failure. Sensed humidity levels that fall below thresholds of 30% or 40% and sensed humidity levels that exceed thresholds of 60% or 70% may indicate malfunctioning evaporative cooling system and can be used to trigger alerts or automatic adjustment of the evaporative cooling system to improve performance or conserve water.

Figure 10:
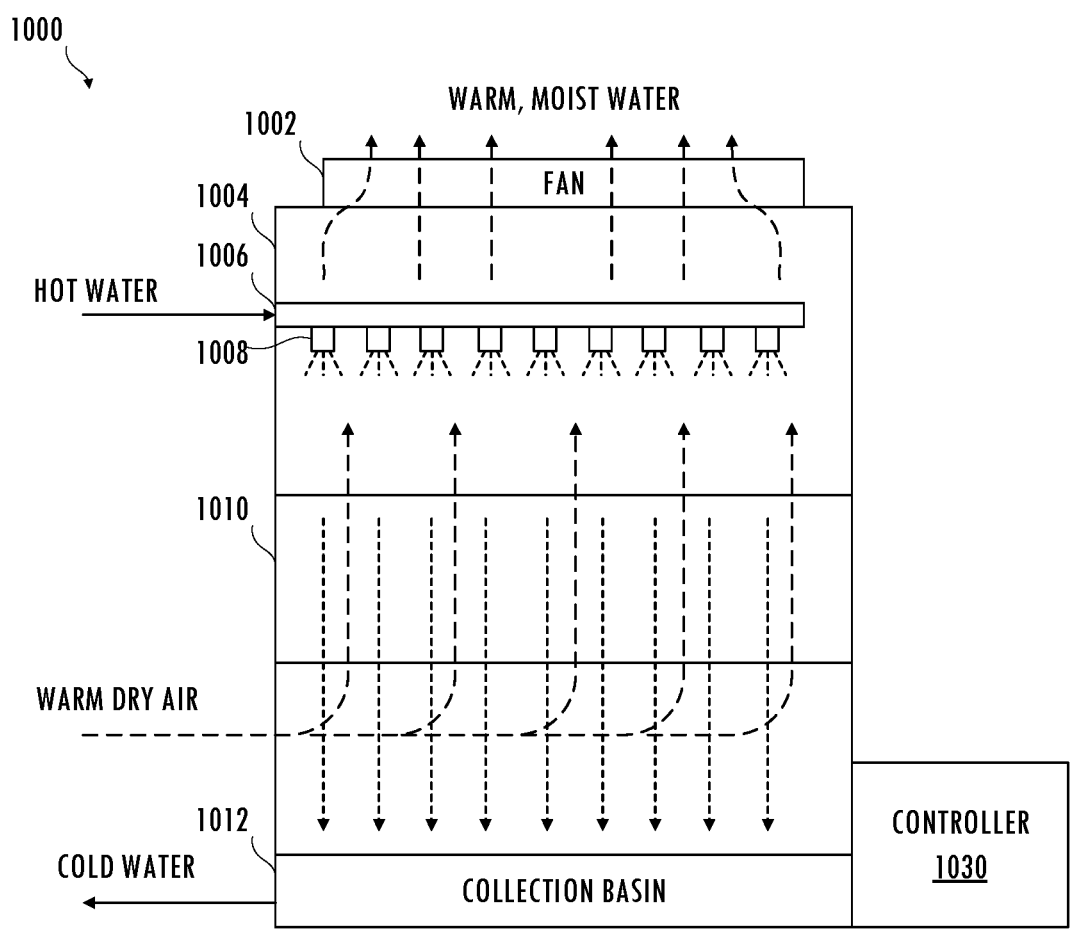
FIG. 10 illustrates a functional block diagram of a portion of the moisture monitoring system monitoring an exemplary cooling tower consistent with at least one embodiment of the invention.

Referring to FIGS. 1 and 10, in at least one embodiment, moisture monitoring system 100 monitors operation of cooling tower. For example, cooling tower 1000 is a heat exchanger that receives hot water in distribution structure 1006 and uses nozzles 1008 to spray the hot water to cause it to contact warm dry air in fill section 1010 to lower the temperature of the water. After the water passes through fill section 1010, the water cascades to collection basin 1012 and cold water is pumped back into distribution structure 1006. Fan 1002 draws warm, moist air out of the cooling tower and heat leaves the cooling tower by evaporation. The evaporation process consumes a substantial amount of water causing a need for cooling tower 1000 to be refilled. Moisture monitoring system 100 can use wireless monitoring nodes to detect the need for water replacement and maintenance or to calibrate the control of distribution structure 1006 and nozzles 1008. In an embodiment, moisture monitoring system 100 monitors water consumption and cycles of concentration of cooling tower 1000. Sensed information can be used to alert system controller 1030 or a user to close valves if water consumption exceeds a predetermined threshold or if cycles of concentration are below another predetermined threshold. If a sensed humidity exceeds yet another predetermined threshold, then the cooling tower may be unable to operate efficiently and controller 1030 may disable operation. In at least one embodiment, the analysis compares sensed temperature to a set point and a remote server or user modulates the amount of cooling tower water directed through a heat exchanger and increases or decreases effective cooling accordingly.

Figure 11:
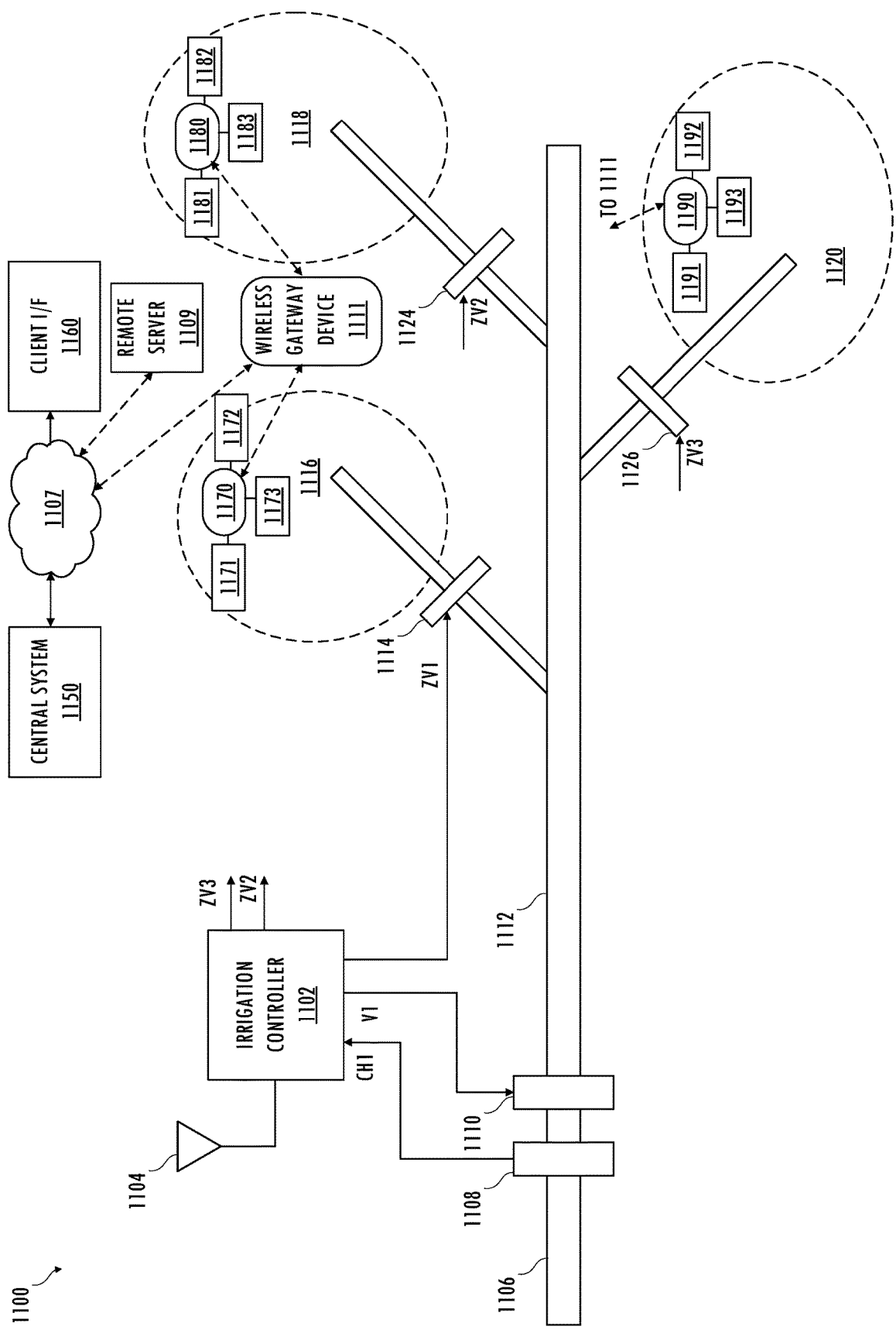
FIG. 11 illustrates a functional block diagram of a portion of the moisture monitoring system monitoring an exemplary fluid delivery system consistent with at least one embodiment of the invention.

Referring to FIG. 11, in an embodiment, moisture monitoring system 100 is configured to monitor irrigation system 1100, which includes central system 1150 that communicates with a client interface 1160 to provide water delivery management resources to a user. Central system 1150 is cloud-based and is accessible to client interface 1160 via network 1107, which includes a network of interconnected computers and communications devices (e.g., the Internet). Irrigation controller 1102 communicates with central system 1150 via network 1107 using wireless interface 1104 and antenna 1104. In other embodiments, irrigation controller 1102 is coupled to central system 1150 by wireline communications. Irrigation controller 1102 provides control signals that enable and disable water delivery from utility line 1106 to water receiving zones 1116, 1118, and 1120 via mainline 1112. Mainline 1112 includes all of the pipes between utility line 1106 and irrigation zone control valves 1114, 1124, and 1126. Although mainline 1112 may be a single linear pipe, in other embodiments mainline 1112 has a loop configuration or comprises additional pipes. Central system 1150 communicates commands to irrigation controller 1102 to test the fluid delivery system for leaks and feeds back information received from sensor 1108 (e.g., utility water meter, flow rate sensor, or pressure sensor) to central system 1150. For example, central system 1150 electronically controls master valve 1110 and zone control valves 1114, 1124, and 1126 to open or close using control signals V1, ZV1, ZV2, and ZV3, respectively.

Irrigation controller 1102 includes sensor interface channel CH1 that receives flow rate information from sensor 1108. In at least one embodiment, sensor 1108 is a flow rate sensor that measures mass or volumetric flow rate of a fluid in mainline 1112. A typical flow rate sensor provides data in gallons per minute (gpm) using pulses (e.g., a contact closure pulse input signal), although other rates and signal formats may be used. Irrigation controller 1102 includes a sensor channel that can receive the pulsed signal (e.g., a contact closure pulse input interface) and converts it into a digital signal (e.g., using a counter to count a total number of pulses received over a predetermined time) for communication to central system 1150. Central system 1150 converts that digital signal into a corresponding flow rate, e.g., using a predetermined look-up table or a digital-to-flow rate value conversion algorithm, for use in data analytics and cost generation performed by central system 1150.

In at least one embodiment, wireless monitoring nodes 1170, 1180, and 1190 are located in zones 1116, 1118, and 1120, respectively, of an irrigated property. Sensors 1171, 1172, and 1173, sensors 1181, 1182, and 1183, and sensors 1191, 1192, and 1193 provide sensed information to corresponding wireless monitoring nodes. That sensed information can indicate soil moisture levels or changes to those soil moisture levels. Wireless monitoring nodes 1170, 1180, and 1190 communicate indications of the sensed information, changes to the sensed information, or data based on analysis of the sensed information to wireless gateway device 1111, which communicates that information to remote server 1109 via network 1107. Remote server 1109 stores the data, analyzes the data, provides alerts or displays the analysis on client interface 1160. In at least one embodiment, remote server 1109 communicates with irrigation controller 1102 to adjust operation of the irrigation system based on the sensed information (e.g., opens valves or closes valves in response to dry soil or wet soil, respectively).

Thus, techniques for monitoring and managing moisture in an environment associated with a fluid delivery system have been described. The description of the invention set forth herein is illustrative and is not intended to limit the scope of the invention as set forth in the following claims. For example, while the invention has been described in embodiments in which a moisture monitoring system is used in evaporative cooling systems in data center applications, a cooling tower, and irrigation systems, one of skill in the art will appreciate that the teachings herein can be utilized with other fluid delivery systems in other applications.

The terms "first," "second," "third," and so forth, as used in the claims, unless otherwise clear by context, distinguish between different items in the claims and do not otherwise indicate or imply any order in time, location or quality. For example, "a first received network signal," and "a second received network signal," do not indicate or imply that the first received network signal occurs in time before the second received network signal. Software (including firmware), as described herein, may be encoded in at least one tangible (i.e., non-transitory) computer readable medium. As referred to herein, a tangible computer-readable medium includes at least a disk, tape, or other magnetic, optical, or electronic storage medium. Variations and modifications of the embodiments disclosed herein may be made based on the description set forth herein, without departing from the scope of the invention as set forth in the following claims.

What is claimed is:

1. A method for monitoring moisture conditions, the method comprising:
   receiving sensed information from a sensor interface of a wireless moisture monitoring node; and
   transmitting, by the wireless moisture monitoring node, an indication of the sensed information in response to detecting a change between the sensed information and stored prior sensed information.

2. The method as recited in claim 1 further comprising:
   configuring a mode of operation of the wireless moisture monitoring node based on a configuration signal received by the wireless moisture monitoring node,
   wherein the wireless moisture monitoring node has an automatic meter reading mode, a pulse flow mode, and a moisture sensor mode.

3. The method as recited in claim 2 wherein the wireless moisture monitoring node stores the sensed information, the sensed information being a water meter reading, a water flow rate, or information regarding presence or absence of moisture in each of a plurality of zones of a fluid delivery system.

4. The method as recited in claim 1 further comprising:
   periodically transmitting a packet including power information associated with the wireless moisture monitoring node; and
   adjusting a power mode of the wireless moisture monitoring node in response to successful transmission of a predetermined number of packets.

5. The method as recited in claim 1 wherein the sensed information is associated with a presence or an absence of moisture in a zone of an evaporative cooling panel in an evaporative cooling system.

6. The method as recited in claim 5 further comprising:
   determining a wetting rate or an evaporation rate of the zone of the evaporative cooling panel based on the sensed information; and
   adjusting water delivery of the evaporative cooling system based on the wetting rate or the evaporation rate.

7. The method as recited in claim 1 further comprising:
   providing the indication of the sensed information to a management system of a fluid delivery system.

8. The method as recited in claim 1 wherein the indication is transmitted from a location proximate to a sensor associated with the indication, the method further comprising:
   receiving the indication of the sensed information using local area network communications;
   transmitting the indication of the sensed information using wide area wireless communications;
   performing analysis of a fluid delivery system based on the indication and stored information; and
   providing an alert or control signal update based on the analysis.

9. A moisture monitoring system comprising:
   a wireless moisture monitoring node comprising:
      a sensor interface configured to receive sensed information;
      a controller configured to cause transmission of an indication of the sensed information in response to detecting a difference between the sensed information and stored prior sensed information; and
      a wireless communications interface configured to use local area wireless communications to transmit the indication of the sensed information.

10. The moisture monitoring system as recited in claim 9 wherein the controller is further configured to cause periodic transmission of power information associated with the wireless moisture monitoring node, and to adjust a power mode of the wireless moisture monitoring node in response to successful transmission of a predetermined number of packets.

11. The moisture monitoring system as recited in claim 9 further comprising:
   a wireless gateway device comprising:
      a local area network transceiver configured to receive the indication of the sensed information;
      a memory configured to store the indication; and
      a wide area network transceiver configured to transmit the indication of the sensed information.

12. The moisture monitoring system as recited in claim 11 wherein the wireless moisture monitoring node is proximate to a sensor and is included in a network of the wireless gateway device and additional wireless moisture monitoring nodes and corresponding sensors, the corresponding sensors being disposed throughout an area affected by operation of a fluid delivery system.

13. The moisture monitoring system as recited in claim 9 further comprising:
   a remote server configured to receive the indication of the sensed information and configured to perform moisture analysis of a fluid delivery system, the moisture analysis being based on the indication and information stored in the remote server,
   wherein the remote server is further configured to provide a user alert, adjust a control signal of the fluid delivery system, or schedule maintenance of the fluid delivery system based on the moisture analysis.

14. The moisture monitoring system as recited in claim 9 further comprising:
   a repeater node comprising a second wireless communications interface, the repeater node being configured to provide the indication of the sensed information to a management system of a fluid delivery system.

15. The moisture monitoring system as recited in claim 9 wherein the sensed information is associated with moisture in a zone of an evaporative cooling panel in an evaporative cooling system.

16. The moisture monitoring system as recited in claim 15 further comprising:
   a plurality of moisture sensing probes,
   wherein the sensor interface comprises a plurality of switches coupled between corresponding moisture sensing probes of the plurality of moisture sensing probes and corresponding terminals of general-purpose input/output terminals of the controller, and
   wherein the controller includes a plurality of general-purpose input/output terminals and the controller is further configured to determine a moisture condition associated with each probe of the plurality of moisture sensing probes and configured to cause the wireless communications interface to transmit a respective indication of the moisture condition of each probe of the plurality of moisture sensing probes.

17. A moisture monitoring system comprising:
   a plurality of moisture sensing probes;
   a wireless moisture monitoring node comprising:
      a wireless communications interface;
      a controller; and
      a plurality of switches coupled between corresponding moisture sensing probes of the plurality of moisture sensing probes and corresponding terminals of general-purpose input/output terminals of the controller, and wherein the controller is configured to cause the wireless communications interface to transmit an indication of a moisture condition sensed by each probe of the plurality of moisture sensing probes based on information received from the plurality of moisture sensing probes using the plurality of switches and the general-purpose input/output terminals.

18. The moisture monitoring system as recited in claim 17 further comprising:
a memory configured to store the moisture condition sensed by each probe,
wherein the indication is information regarding presence or absence of moisture in a zone associated with an evaporative cooling panel of an evaporative cooling system.

19. The moisture monitoring system as recited in claim 18 wherein the controller is further configured to cause periodic transmission of power information associated with the wireless moisture monitoring node, and to adjust a power mode of the wireless moisture monitoring node in response to successful transmission of a predetermined number of packets.

20. The moisture monitoring system as recited in claim 18 further comprising:
a repeater node comprising a second wireless communications interface, the repeater node being configured to provide the indication to a management system of the evaporative cooling system.

* * * * *